(12) United States Patent
Beer et al.

(10) Patent No.: US 9,573,085 B2
(45) Date of Patent: *Feb. 21, 2017

(54) OIL SUMP HAVING OIL FILTER

(71) Applicant: IBS Filtran Kunststoff-/Metallerzeugnisse GmbH, Morsbach (DE)

(72) Inventors: Markus Beer, Morsbach (DE); Dietmar Sahm, Reichshof (DE); Wolfgang Stausberg, Morsbach (DE); Andreas Piehlk, Freudenberg (DE); Michael Jacob, Morsbach (DE)

(73) Assignee: IBS FILTRAN KUNSTSTOFF-/METALLERZEUGNISSE GMBH, Morsbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,745

(22) Filed: Jan. 26, 2015

(65) Prior Publication Data

US 2015/0129471 A1    May 14, 2015

Related U.S. Application Data

(62) Division of application No. 12/482,339, filed on Jun. 10, 2009, now abandoned.

(30) Foreign Application Priority Data

Jun. 10, 2008  (DE) .......................... 10 2008 027 662

(51) Int. Cl.
 *B01D 35/00* (2006.01)
 *F01M 11/04* (2006.01)
 (Continued)

(52) U.S. Cl.
 CPC ........ *B01D 35/005* (2013.01); *F01M 11/0004* (2013.01); *F01M 11/0408* (2013.01);
 (Continued)

(58) Field of Classification Search
 None
 See application file for complete search history.

(56) References Cited

U.S. PATENT DOCUMENTS 1,868,055 A * 7/1932 Edwards .................. F01M 1/10
                                                           184/6.24
3,014,592 A * 12/1961 Stephens ............. F16H 57/0404
                                                           210/167.08

(Continued)

FOREIGN PATENT DOCUMENTS

JP            2009299687 A   *  12/2009

*Primary Examiner* — Robert James Popovics
(74) *Attorney, Agent, or Firm* — Grossman, Tucker, Perreault & Pfleger, PLLC

(57) ABSTRACT

An oil sump, preferably made of plastic or metal, for motors or transmissions and having a filter housing, comprises a filter housing top shell, a filter housing bottom shell, a filter medium, a filter inlet, and a filter outlet, and an oil drain opening in the floor area of the oil sump, which is implemented in such a way that it is closable using an oil drain screw having external thread, which comes from the oil sump bottom side. The filter housing comprises an internal thread which is implemented to receive the external thread of the oil drain screw, the filter housing being at least partially fastened on the oil sump via the oil drain screw, which closes the oil drain opening and engages using its external thread in the internal thread on the filter housing side.

4 Claims, 6 Drawing Sheets

(51) Int. Cl.
*F16H 57/04* (2010.01)
*F01M 11/00* (2006.01)

(52) U.S. Cl.
CPC ....... *F16H 57/04* (2013.01); *F01M 2011/007* (2013.01); *F01M 2011/0416* (2013.01); *F16H 57/0404* (2013.01); *F16H 57/0452* (2013.01)

(56) References Cited

U.S. PATENT DOCUMENTS

| | | | | |
|---|---|---|---|---|
| 3,056,501 A * | 10/1962 | Thorman | ............... | B01D 27/06 123/196 A |
| 3,211,291 A * | 10/1965 | Teutsch | ............... | B01D 35/005 210/172.3 |
| 3,371,793 A * | 3/1968 | Fowler | ............... | B01D 29/0018 210/167.02 |
| 3,480,149 A * | 11/1969 | Houser | ............... | B01D 35/0273 210/445 |
| 3,784,011 A * | 1/1974 | Ward | ............... | B01D 29/055 210/167.03 |
| 4,136,011 A * | 1/1979 | Joseph | ............... | B01D 29/05 210/167.08 |
| 4,264,443 A * | 4/1981 | Anderson | ............... | B01D 29/05 210/167.08 |
| 4,270,497 A * | 6/1981 | Valerio | ............... | F01M 11/0004 123/195 C |
| 4,352,737 A * | 10/1982 | Taniguchi | ............... | B01D 35/0273 210/167.08 |
| 4,387,023 A * | 6/1983 | Napier | ............... | B01D 35/0273 210/167.08 |
| 4,402,827 A * | 9/1983 | Joseph | ............... | B01D 35/0273 210/167.08 |
| 4,439,321 A * | 3/1984 | Taki | ............... | B01D 46/0005 210/493.1 |
| 4,450,081 A * | 5/1984 | Anderson | ............... | B01D 29/012 210/167.08 |
| 4,600,511 A * | 7/1986 | Sherman | ............... | B01D 35/0273 210/316 |
| 4,604,200 A * | 8/1986 | Machart, Jr. | ............... | B01D 35/0273 210/314 |
| 4,666,594 A * | 5/1987 | Schneider | ............... | B01D 19/02 123/593 |
| 4,790,938 A * | 12/1988 | Younger | ............... | B01D 29/23 210/484 |
| 4,804,466 A * | 2/1989 | Cooper | ............... | B01D 29/15 210/316 |
| 4,826,598 A * | 5/1989 | Cain | ............... | B01D 35/0273 210/323.2 |
| 4,828,694 A * | 5/1989 | Leason | ............... | B01D 29/23 210/167.08 |
| 4,869,816 A * | 9/1989 | Markl | ............... | B01D 35/0273 209/403 |
| 4,995,971 A * | 2/1991 | Droste | ............... | F01M 11/0004 184/6.2 |
| 5,049,274 A * | 9/1991 | Leason | ............... | B01D 35/0273 156/73.1 |
| 5,292,432 A * | 3/1994 | Jainek | ............... | B01D 29/07 210/232 |
| 5,314,616 A * | 5/1994 | Smith | ............... | B01D 29/012 184/6.24 |
| 5,494,575 A * | 2/1996 | Kitajima | ............... | B01D 29/23 184/6.24 |
| 5,564,526 A * | 10/1996 | Barnard | ............... | B03C 1/286 184/6.25 |
| 5,607,637 A * | 3/1997 | Beer | ............... | B29C 33/12 264/271.1 |
| 5,863,424 A * | 1/1999 | Lee | ............... | B01D 29/07 210/167.02 |
| 6,013,179 A * | 1/2000 | Laughlin | ............... | B01D 29/07 210/172.1 |
| 6,143,169 A * | 11/2000 | Lee | ............... | B01D 29/07 123/196 A |
| 6,187,185 B1 * | 2/2001 | Lee | ............... | B01D 35/0273 184/6.24 |
| 6,190,546 B1 * | 2/2001 | Agner | ............... | B01D 35/0273 210/167.08 |
| 6,193,833 B1 * | 2/2001 | Gizowski | ............... | B01D 29/111 156/272.8 |
| 6,394,162 B2 * | 5/2002 | Gizowski | ............... | B01D 29/111 156/359 |
| 6,432,307 B2 * | 8/2002 | Gizowski | ............... | 210/321.6 |
| 6,488,844 B2 * | 12/2002 | Willis | ............... | B01D 35/027 184/106 |
| 6,503,393 B2 * | 1/2003 | Caiozza | ............... | B03C 1/28 184/106 |
| 6,523,561 B2 * | 2/2003 | Kapcoe | ............... | F16H 57/0404 137/15.01 |
| D472,247 S * | 3/2003 | Beer | ............... | D15/5 |
| 6,539,912 B1 * | 4/2003 | Beer | ............... | F01M 11/0004 123/196 R |
| 6,582,593 B2 * | 6/2003 | Wolford | ............... | B01D 35/0273 210/130 |
| 6,585,889 B2 * | 7/2003 | Weingaertner | ............... | F01M 11/0004 210/172.2 |
| 6,616,836 B1 * | 9/2003 | Covington | ............... | B01D 29/016 210/167.02 |
| 6,648,146 B2 * | 11/2003 | Beer | ............... | F01M 11/0004 210/167.02 |
| 6,695,148 B2 * | 2/2004 | Homonoff | ............... | B01D 39/163 210/491 |
| 6,715,459 B2 * | 4/2004 | Rosendahl | ............... | B01D 29/012 123/195 C |
| 6,790,348 B2 * | 9/2004 | Orborn | ............... | B01D 35/027 210/167.08 |
| 6,793,812 B2 * | 9/2004 | Caldwell | ............... | B01D 29/15 210/167.04 |
| 6,808,575 B2 * | 10/2004 | Mauelshagen | ............... | B29C 65/06 156/292 |
| 6,827,848 B2 * | 12/2004 | Covington | ............... | B01D 29/016 210/167.02 |
| 6,835,306 B2 * | 12/2004 | Caldwell | ............... | B01D 29/05 210/167.04 |
| 6,972,087 B2 * | 12/2005 | Wolford | ............... | B01D 35/0273 210/130 |
| 7,087,160 B2 * | 8/2006 | Beer | ............... | B01D 35/0273 156/580.1 |
| 7,128,218 B2 * | 10/2006 | Rosendahl | ............... | F01M 11/0004 210/435 |
| 7,134,568 B2 * | 11/2006 | Moriyama | ............... | B60K 15/077 210/251 |
| 7,217,357 B2 * | 5/2007 | Rosendahl | ............... | B01D 35/027 210/130 |
| 7,258,789 B2 * | 8/2007 | Peet | ............... | B01D 29/07 210/232 |
| 7,261,814 B2 * | 8/2007 | Peet | ............... | B01D 29/012 210/232 |
| 7,282,140 B2 * | 10/2007 | Boast | ............... | B01D 35/0273 210/130 |
| 7,331,771 B2 * | 2/2008 | Schultz | ............... | B01D 35/0273 417/313 |
| 7,357,865 B1 * | 4/2008 | Nader | ............... | B01D 35/0273 210/130 |
| 7,383,809 B2 * | 6/2008 | Rosendahl | ............... | F01M 11/0004 123/196 A |
| 7,429,322 B2 * | 9/2008 | Fujita | ............... | B01D 17/00 210/172.4 |
| 7,845,500 B2 * | 12/2010 | Hueppchen | ............... | B01D 35/0273 210/130 |
| 7,875,171 B2 * | 1/2011 | Pekarsky | ............... | B01D 35/0273 210/132 |
| 7,901,572 B2 * | 3/2011 | Sato | ............... | B01D 35/0273 210/172.4 |
| 7,964,096 B2 * | 6/2011 | Kimisawa | ............... | F02M 37/025 123/509 |
| 7,998,347 B2 * | 8/2011 | Pekarsky | ............... | B01D 29/05 210/167.01 |
| 8,038,877 B2 * | 10/2011 | Stausberg | ............... | B01D 29/52 184/6.24 |

(56) References Cited

U.S. PATENT DOCUMENTS

| Patent/Pub. No. | Date | Inventor | Classification |
|---|---|---|---|
| 8,137,546 B2* | 3/2012 | Ogose | B01D 35/0273 210/172.4 |
| 8,157,105 B2* | 4/2012 | Nishiyama | F16H 57/0404 123/196 A |
| 8,173,013 B2* | 5/2012 | Sato | B01D 35/0273 210/172.4 |
| 8,246,819 B2* | 8/2012 | Sakata | B01D 29/111 156/272.8 |
| 8,302,506 B2* | 11/2012 | Iwata | F16H 57/0447 74/606 R |
| 8,372,278 B1* | 2/2013 | Nguyen | B01D 35/0273 123/196 A |
| 8,486,277 B1* | 7/2013 | Nader | B01D 35/147 184/6.24 |
| 8,496,812 B2* | 7/2013 | Beer | F01M 11/0004 210/167.03 |
| 8,502,527 B2* | 8/2013 | Bradley | G01R 33/072 324/207.2 |
| 8,673,141 B2* | 3/2014 | Stausberg | B01D 35/0273 210/172.4 |
| 8,715,497 B2* | 5/2014 | Schnipke | B01D 35/0273 210/172.2 |
| 9,004,291 B2* | 4/2015 | Saito | B01D 46/0002 210/455 |
| 9,084,950 B2* | 7/2015 | Saito | B01D 35/0273 |
| 9,427,685 B2* | 8/2016 | Pekarsky | B01D 35/0273 |
| 2001/0000877 A1* | 5/2001 | Gizowski | B01D 29/111 156/350 |
| 2001/0000894 A1* | 5/2001 | Gizowski | B01D 29/111 210/435 |
| 2001/0047996 A1* | 12/2001 | Weingaertner | F01M 11/0004 220/571 |
| 2002/0104614 A1* | 8/2002 | Beer | B29C 65/1635 156/272.8 |
| 2003/0006085 A1* | 1/2003 | Caldwell | B01D 29/15 180/339 |
| 2003/0006179 A1* | 1/2003 | Caldwell | B01D 29/05 210/167.08 |
| 2003/0094405 A1* | 5/2003 | Stamey, Jr. | B01D 29/05 210/85 |
| 2003/0132147 A1* | 7/2003 | Rosendahl | B01D 35/027 210/130 |
| 2003/0132157 A1* | 7/2003 | Beer | F01M 11/0004 210/435 |
| 2003/0140887 A1* | 7/2003 | Rosendahl | B01D 29/012 123/195 C |
| 2003/0150552 A1* | 8/2003 | Beer | B01D 29/111 156/272.8 |
| 2004/0007520 A1* | 1/2004 | Rosendahl | F01M 11/0004 210/435 |
| 2004/0129368 A1* | 7/2004 | Mauelshagen | B29C 65/06 156/73.6 |
| 2004/0237485 A1* | 12/2004 | Beer | B01D 35/0273 55/379 |
| 2005/0098508 A1* | 5/2005 | Caldwell | B01D 29/05 210/805 |
| 2005/0139541 A1* | 6/2005 | Peet | B01D 35/0273 210/436 |
| 2005/0230323 A1* | 10/2005 | Peet | B01D 29/07 210/767 |
| 2005/0230324 A1* | 10/2005 | Peet | B01D 29/012 210/767 |
| 2006/0016740 A1* | 1/2006 | Schultz | B01D 35/0273 210/130 |
| 2006/0169632 A1* | 8/2006 | Suzuki | B01D 29/07 210/493.1 |
| 2006/0207928 A1* | 9/2006 | Morikawa | B01D 29/012 210/435 |
| 2006/0231482 A1* | 10/2006 | Khalil | B01D 35/0273 210/473 |
| 2007/0017745 A1* | 1/2007 | Rosendahl | F01M 11/0004 184/6.24 |
| 2007/0151906 A1* | 7/2007 | Beer | B01D 35/0273 210/130 |
| 2008/0290013 A1* | 11/2008 | Stausberg | B01D 29/52 210/167.04 |
| 2009/0090669 A1* | 4/2009 | Holzmann | B01D 46/0002 210/450 |
| 2009/0127174 A1* | 5/2009 | Shinbori | B01D 35/0273 210/167.08 |
| 2009/0139922 A1* | 6/2009 | Poskie | B01D 35/0273 210/167.08 |
| 2009/0230049 A1* | 9/2009 | Stausberg | B01D 35/0273 210/416.5 |
| 2009/0294343 A1* | 12/2009 | Pekarsky | B01D 29/05 210/167.08 |
| 2009/0301954 A1* | 12/2009 | Beer | F01M 11/0004 210/167.08 |
| 2010/0038296 A1* | 2/2010 | Beer | F01M 11/0004 210/167.03 |
| 2011/0041649 A1* | 2/2011 | Iwata | F16H 57/0447 74/606 R |
| 2011/0259810 A1* | 10/2011 | Sakata | B01D 29/111 210/358 |
| 2011/0284453 A1* | 11/2011 | Toyoshima | B01D 35/0273 210/435 |
| 2012/0086445 A1* | 4/2012 | Bradley | G01R 33/072 324/251 |
| 2012/0305469 A1* | 12/2012 | Stausberg | B01D 29/52 210/335 |
| 2013/0008845 A1* | 1/2013 | Saito | B01D 46/0002 210/455 |
| 2013/0118964 A1* | 5/2013 | Dedering | B01D 35/06 210/167.04 |
| 2013/0146517 A1* | 6/2013 | O'Brien | B01D 35/0273 210/153 |
| 2013/0146526 A1* | 6/2013 | Saito | B01D 35/0273 210/435 |
| 2013/0168308 A1* | 7/2013 | Scagliarini | B01D 35/0273 210/416.4 |
| 2013/0306534 A1* | 11/2013 | Beer | F01M 11/0004 210/167.02 |
| 2014/0076795 A1* | 3/2014 | Pekarsky | B01D 35/0273 210/348 |
| 2014/0091023 A1* | 4/2014 | Long | F16H 57/0441 210/167.08 |
| 2014/0116931 A1* | 5/2014 | Beer | F01M 11/0004 210/196 |
| 2014/0116963 A1* | 5/2014 | Dziurda | F16H 57/0404 210/767 |
| 2014/0144831 A1* | 5/2014 | Rosendahl | B01D 35/0273 210/416.5 |
| 2014/0158594 A1* | 6/2014 | Schneider | F16H 57/0404 210/167.08 |
| 2014/0346119 A1* | 11/2014 | Ammler | F16H 57/0402 210/739 |
| 2015/0129471 A1* | 5/2015 | Beer | B01D 35/005 210/167.08 |
| 2016/0023137 A1* | 1/2016 | Sorger | B01D 46/4236 210/435 |
| 2016/0023622 A1* | 1/2016 | Long | F16H 57/0441 184/6.12 |

* cited by examiner

OIL SUMP HAVING OIL FILTER

CROSS-REFERENCE TO RELATED APPLICATIONS

This application is a divisional (continuing) application of U.S. patent application Ser. No. 12/482,339, filed Jun. 10, 2009, now pending, and published as US 2009/0301954, the entire disclosure of which is hereby incorporated by reference in its entirety. This application also claims priority to German patent application DE 10 2008 027 662.6, filed Jun. 10, 2008, the disclosure of which is also hereby incorporated by reference in its entirety.

FIELD OF THE INVENTION

The present invention relates to an oil sump. More particularly, the present invention related to an oil sump having an oil filter.

BACKGROUND OF THE INVENTION

Oil sumps known from the prior art, preferably made of metal or plastic, typically have a separate filter placed in direct proximity to the oil sump floor, comprising at least one oil filter medium and one oil filter housing, which is preferably implemented as a suction oil filter. Oil sumps of this type having such an oil filter are known. The filters disclosed above have the problem that complex fastening/fixing of the components to one another is necessary due to the separation of the components, such as the oil sump and oil filter in particular. A connection of these components is performed in the prior art by riveting, etc., for example. Furthermore, oil filters placed separately in an oil sump have a gap between the filter bottom side and the interior side of the oil sump, which results in uncontrolled air suction and the generation of noise by movement of the loose filter in the oil sump. This results in a decrease of the filter efficiency and reduction of the usage comfort.

In other cases, the filter is fastened permanently in the oil sump, for example, by welding/gluing, and is no longer removable. These embodiments have the disadvantage that a separate replacement of the filter is not possible and a replacement of the oil sump/oil filter unit is thus very complex and costly.

SUMMARY OF THE INVENTION

Embodiments of the present invention provide an oil sump having an oil filter, which no longer has the disadvantages described above and/or in particular to disclose an oil sump, preferably made of metal or plastic, having an oil filter, in which the oil filter is permanently integratable, simultaneously, the number of the necessary components being reduced, the assembly being made easier, the costs for production and installation being reduced, undesired disadvantageous technical effects being reduced, and the filter being situated in the oil sump so it is easily replaceable as needed and thus is separable.

One aspect of the invention is achieved by an oil sump according to Claim 1, in which the filter housing comprises an internal thread, which is implemented to receive the external thread of the oil drain screw and in which the filter housing is fastened on the oil sump at least partially via the oil drain screw, which closes the oil drain opening and engages using its external thread in the internal thread on the filter housing side. An important aspect of the invention is thus to use the oil drain screw provided in the oil sump not only for closing the oil drain opening provided in the floor area of the oil sump, but rather simultaneously to fasten at least a part of the filter housing, in particular the filter housing bottom shell, and/or the filter housing top shell, on the oil sump via the oil drain screw. In this way, an especially efficient and cost-effective positioning of at least a part of the oil filter housing is provided, because an oil drain screw is already provided as standard equipment in oil sumps according to the species. The already known closure function of the oil drain screw has added a fastening function for fastening at least a part of the oil filter housing according to the invention. It is possible to provide further fasteners for fastening the filter housing. Fundamentally, however, an important aspect of the invention also allows the filter housing to be fastened on the oil sump solely via the oil drain screw.

Another aspect of the invention is achieved by an oil sump according to Claim 5, in which the filter housing has a clamping means, using which the filter housing is positioned and fastened in the oil sump, in such a way that the clamping means en-gages in a detent means situated on the oil sump side.

The filter housing bottom shell preferably comprises an internal thread, which is implemented to receive the external thread of the oil drain screw. In addition to the filter housing bottom shell, in this embodiment, the filter housing thus also has a filter housing top shell, which is connected in a suitable way to the filter housing bottom shell. For this purpose, further connection means, preferably removable connection means, may be provided, such as detent means, in order to allow a replacement of the filter medium situated inside the filter housing. It is also fundamentally possible in this context, for example, to provide both the filter housing bottom shell and also the filter housing top shell with a suitable internal thread, which are situated lying one above another in the installed state in the screwing-in direction of the oil drain screw, so that the oil drain screw fastens both the filter housing bottom shell and also the filter housing top shell on the oil sump.

In a further preferred embodiment, the filter housing bottom shell is formed by a floor area of the oil sump and the filter housing top shell comprises an internal thread, which is implemented to receive the external thread of the oil drain screw. In this embodiment, a separate filter housing bottom shell is thus not necessary, because this function is achieved by a subarea of the oil sump floor. The module to be fastened on the oil sump, which is open on one side, thus comprises at least the filter housing top shell (and possibly also the filter medium). Correspondingly, the internal thread necessary for receiving the external thread of the oil drain screw is situated on the filter housing top shell. In order to make the engagement of the external thread of the oil drain screw in the internal thread on the filter housing top shell side easier, the internal thread is preferably implemented so that it protrudes from the inner surface of the filter housing top shell and points in the direction toward the oil sump floor. The internal thread and/or the part of the filter housing top shell forming the internal thread especially preferably projects far enough in the direction of the oil sump floor that this part of the filter housing top shell stands up on the oil sump floor and/or is in contact therewith in the installed state. In this way, the filter housing top shell is fastened especially well on the oil sump.

In addition, it has been shown that it is advantageous if the fastening function of the oil drain screw for fixing the filter housing and/or parts thereof is combined with further fasteners. For this purpose, the oil sump has detent means, for example, and suitable clamping means are concurrently situated on the filter housing bottom shell and/or on the filter housing top shell, which are implemented in such a way that they engage in the detent means on the oil sump side to position the filter housing bottom shell and/or the filter housing top shell in the oil sump. In this way, in particular with multipart filter housings, it is possible, for example, to design the fastening capabilities of the individual filter housing parts extremely variably. Thus, for example, the filter housing bottom shell may be fastened using the oil drain screw in the way described above and the filter housing top shell may be clamped via suitable clamping means, such as retention ribs, in detent means on the oil sump side, such as detent webs.

In a further preferred embodiment, the filter unit comprises a receptacle, in particular a receptacle frame, which is implemented to receive the filter medium. The receptacle may be a separate component, or may also be shaped into the oil sump. Furthermore, a seal or an adhesive layer may be provided between the receptacle and the filter housing top shell and/or the oil sump floor, in order to achieve an especially tight connection.

Alternatively to fastening the filter inside the oil sump with the aid of the oil drain screw, clamping means, such as retention ribs, may instead be used for positioning and fastening the filter inside the oil sump, which are implemented in such a way that they engage in detent means situated on the oil sump side, such as webs projecting toward the oil sump inner chamber. In this embodiment, the position of the oil drain screw and/or the oil drain opening is thus not decisive for the fastening of the filter.

Both the oil drain screw and also clamping means may be used for the removable fixing of the oil filter inside the oil sump. Each of the cited fastening variants, namely firstly via the oil drain screw or secondly via clamping means or thirdly via a combination of oil drain screw/clamping means, is applicable both for the one-piece embodiment of the filter housing, i.e., the filter medium is received by the filter housing top shell and the filter housing bottom shell is replaced by the floor area of the oil sump, and also for the two-piece embodiment of the filter housing, i.e., the filter medium is clamped between the filter housing top shell and bottom shell.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

The invention is explained in greater detail hereafter on the basis of the exemplary embodiments illustrated in the drawings.

DETAILED DESCRIPTION

Figure 1:
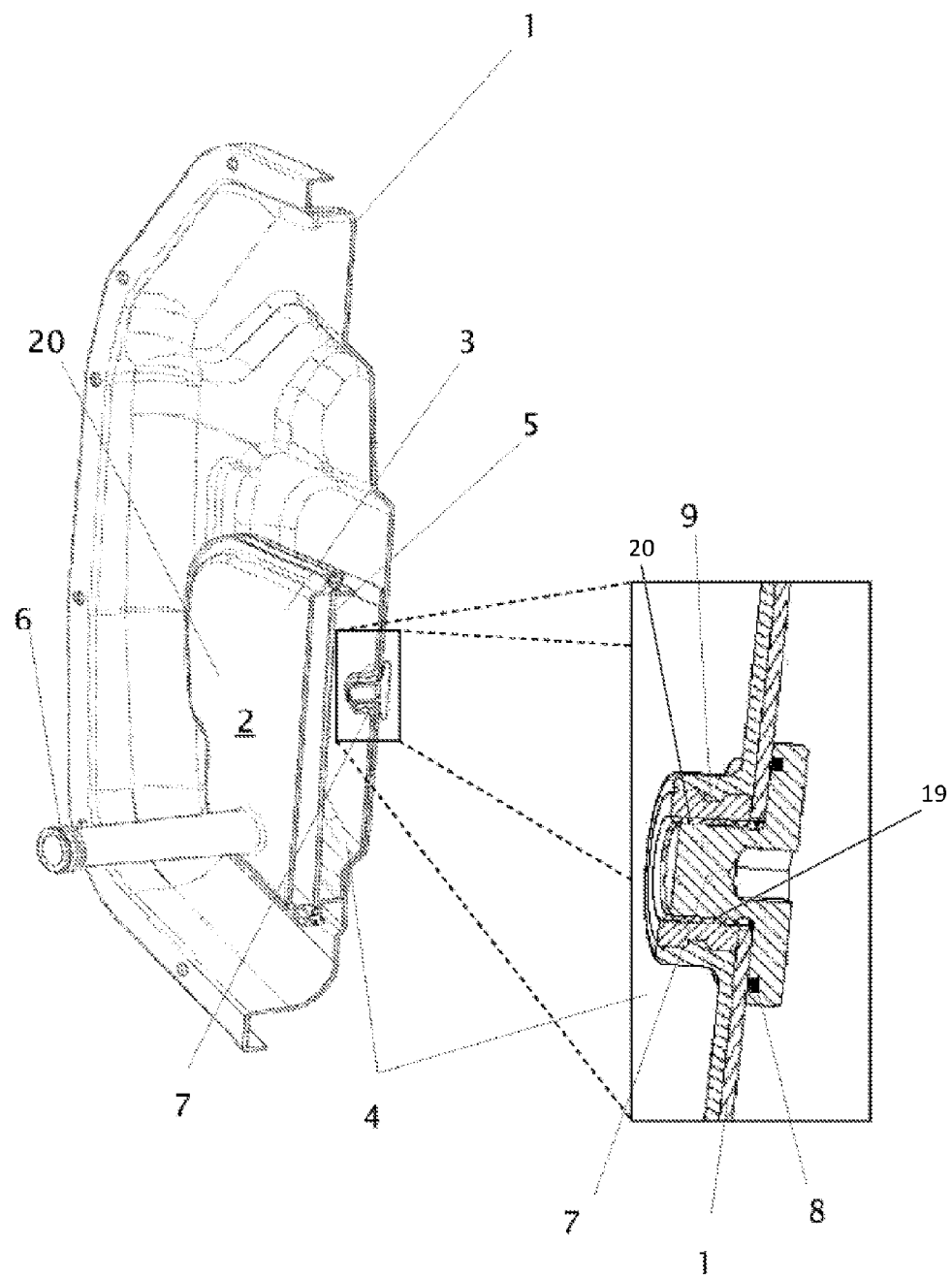
FIG. 1 shows a perspective lateral sectional view through an oil sump having an oil filter in a first embodiment.

The invention will now be described with reference to the drawing figures, in which like reference numerals refer to like parts throughout.

The oil sump 1 according to the first embodiment from FIG. 1 comprises an oil filter 2, fastened on the oil sump 1, having a filter housing top shell 3, a filter housing bottom shell 4, a filter medium 5, which is clamped between the filter housing shells 3 and 4, a filter outlet 6, an oil drain screw 7 having sealing ring 8 and an external thread 19 and an internal thread 20 on the filter housing bottom shell, which is formed by a threaded bush 9 connected to the filter housing bottom shell. The area around the oil drain screw 7 is also emphasized in detail enlargement in FIG. 1.

In the exemplary embodiment according to FIG. 1, the two-piece filter housing made of filter housing top shell 3, which is fastened on the filter housing bottom shell 4, and filter housing bottom shell 4 is thus fastened solely via the internal thread of the threaded bush 9, situated on the filter housing bottom shell 4, in which the external thread of the oil drain screw 7 engages. To replace the entire filter unit, therefore only the oil drain screw 7 has to be removed. This procedure is also particularly advantageous, because an oil change also typically accompanies an oil filter change in practice.

In summary, the following advantages thus result in particular for the first exemplary embodiment:
a) easier mounting on the oil sump (and/or on the transmission),
b) permanently positioned filter,
c) replaceability of the filter is possible solely by removing the oil drain screw 7, and
d) use of the oil drain screw 7 as the filter fixing element, so that no further fasteners are needed.

Figure 2:
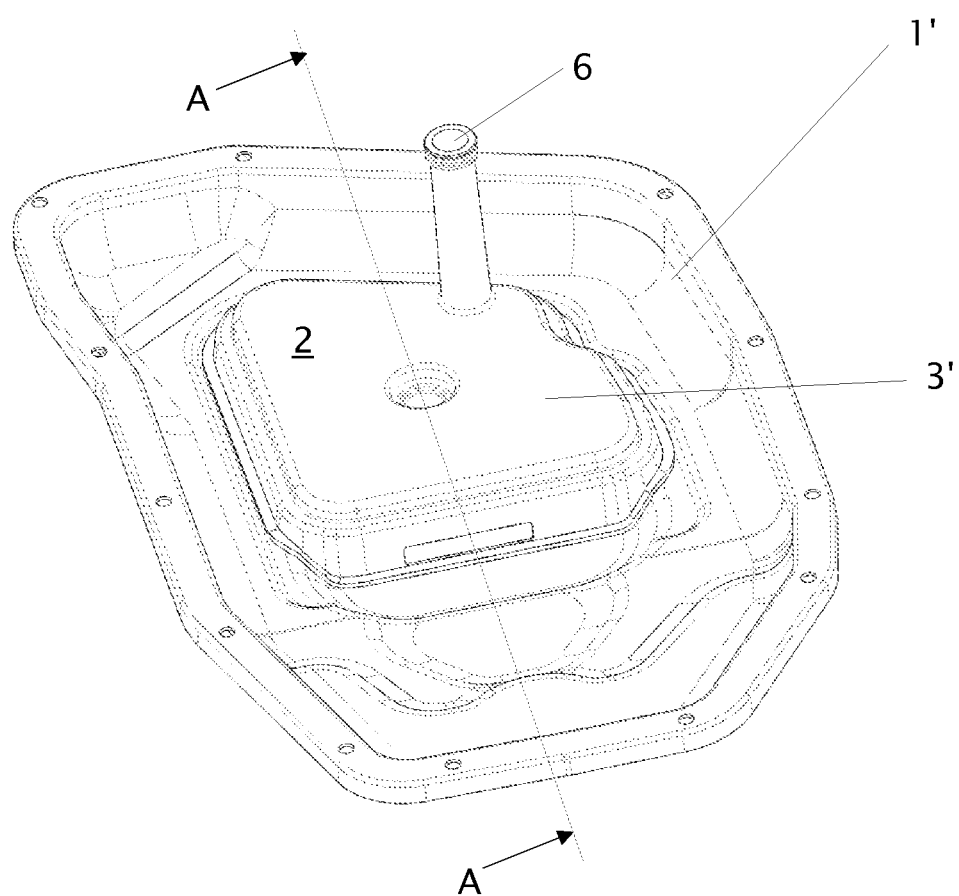
FIG. 2 shows a perspective view of an oil sump having an oil filter in a second embodiment.
Figure 3:
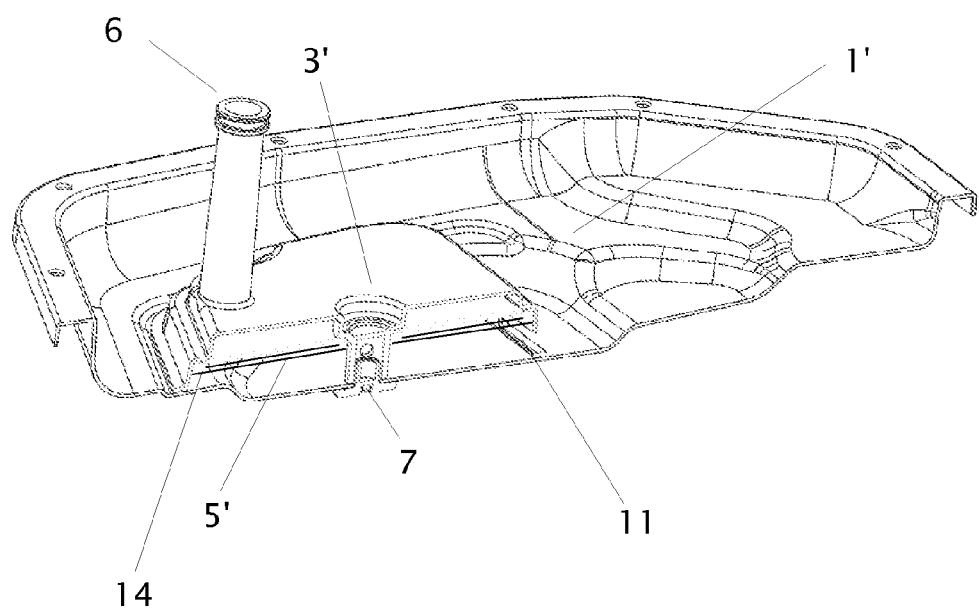
FIG. 3 shows a perspective sectional view of the oil sump from FIG. 2 along line A-A.
Figure 4:
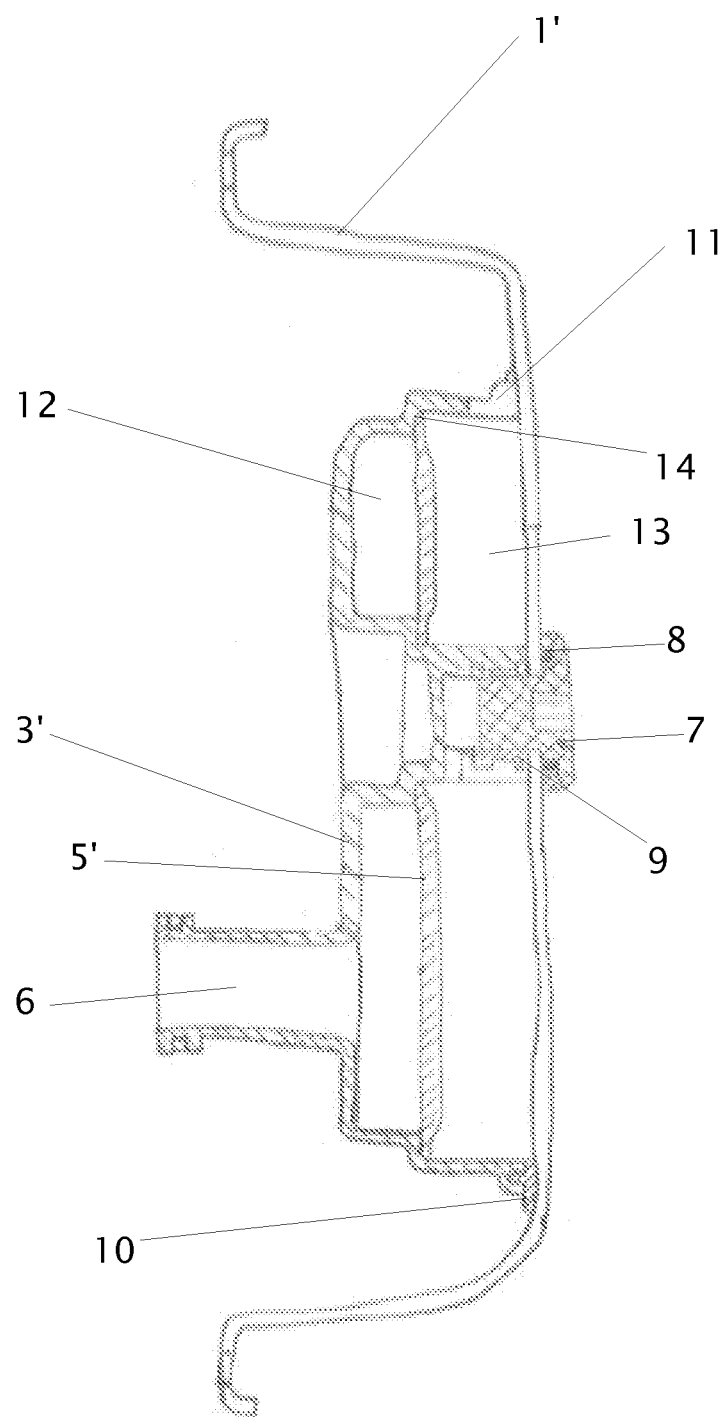
FIG. 4 shows a lateral sectional view of the oil sump from FIG. 2 or 3.

The second embodiment according to FIGS. 2, 3, and 4 comprises an oil sump 1', the filter housing top shell 3', a filter medium 5', a filter outlet 6, an oil drain screw 7 having sealing ring 8, a threaded bush 9, fastened on the filter housing top shell side, having an internal thread (not shown), a filter shell seal 10, a filter inlet 11, a down-stream area 12, and an upstream area 13. The receptacle 14, which is implemented as frame-like, for example, is used to receive the filter medium 5' in this one-piece embodiment of the filter housing 20.

The essential difference from the first embodiment is that the filter housing is partially formed by a floor area of the oil sump 1'. In this way, a separate filter housing bottom shell is not necessary in this embodiment. However, in order to also achieve an outwardly sealed filter housing inner chamber in this embodiment, the oil sump comprises the filter shell seal 10, which is only interrupted in the area of the filter inlet 11, in the contact area with the filter housing top shell 3'. In order to allow fastening of the filter housing and/or in the present case the filter housing top shell 3' on the oil sump, in this embodiment an internal thread is provided on the filter housing top shell 3', which is formed by the threaded bush 9 fastened in the filter housing top shell 3'. The threaded bush 9 is situated in an area projecting from the filter housing top shell 3'. This area projects far enough from the inner surface of the filter housing top shell 3' that it stands up the floor area of the oil sump 1' in the installed state according to FIG. 2.

In summary, in addition to the advantages a) through d) of the first embodiment, the following advantages thus result for the second embodiment:

e) a filter bottom shell is saved,
f) flatter construction is possible, and
g) dispensing with any air gap between filter bottom side and oil sump inner side.

Figure 5:
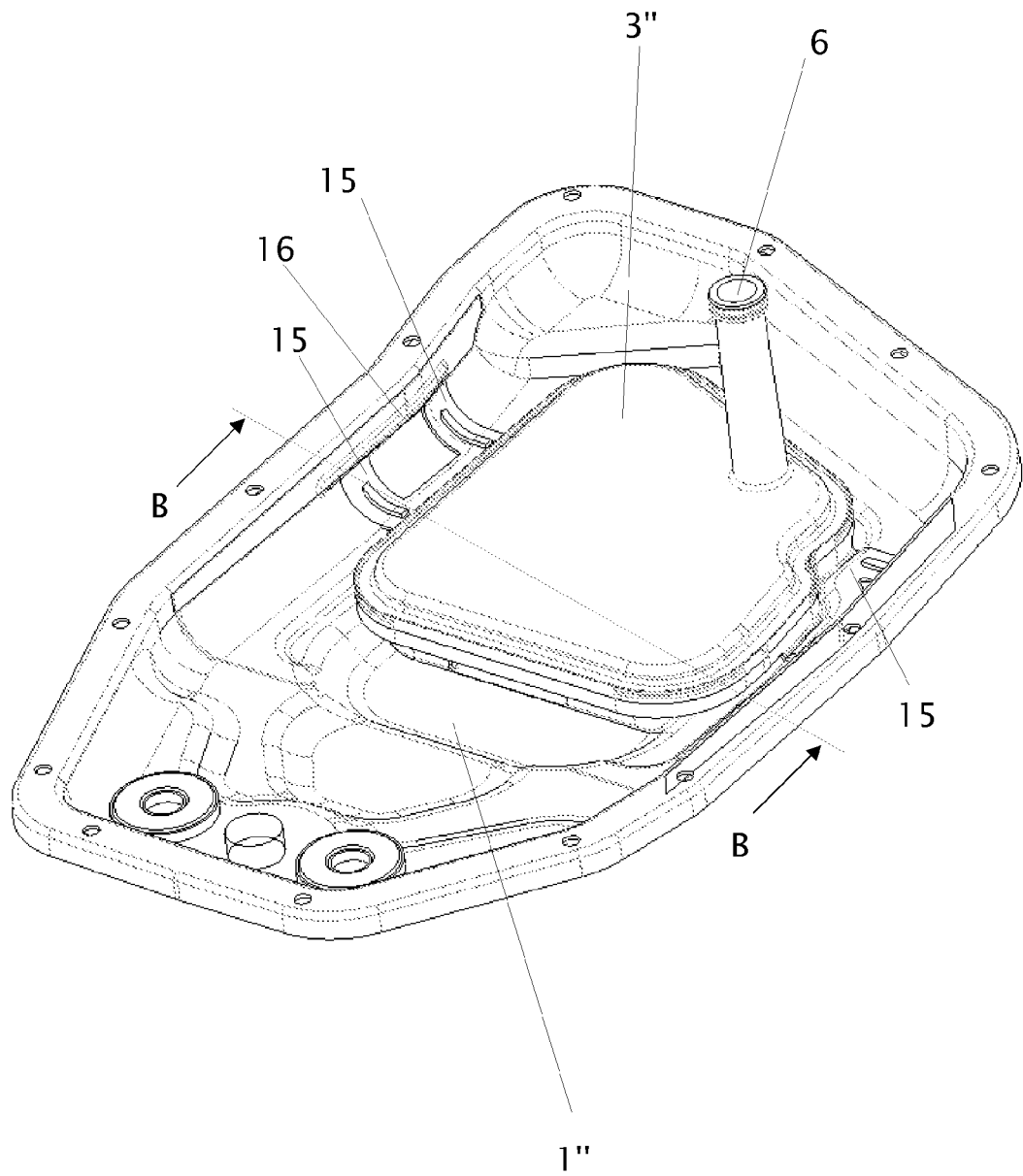
FIG. 5 shows a perspective top view of an oil sump having an oil filter in a third embodiment.
Figure 6:
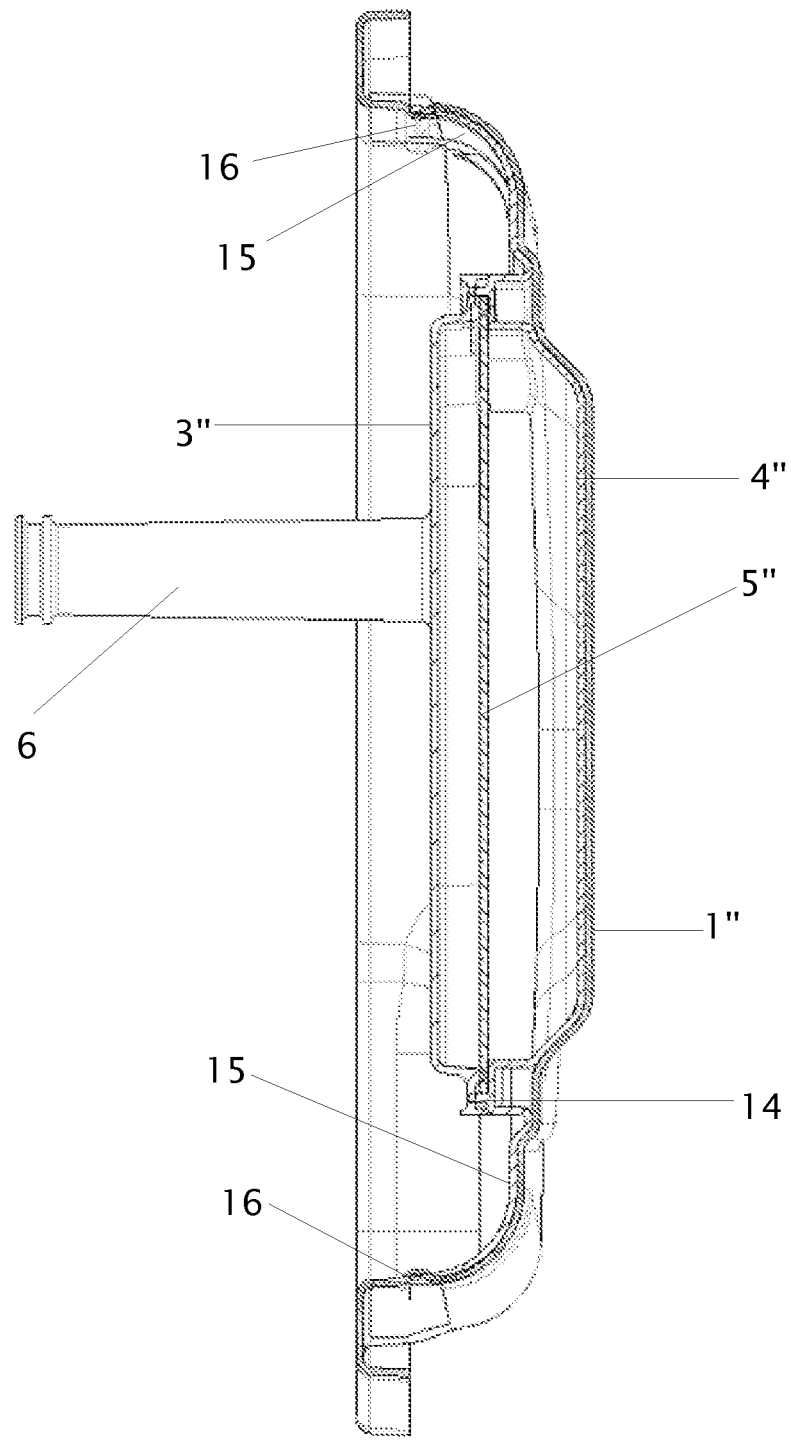
FIG. 6 shows a sectional view of the oil sump from FIG. 5 along line B-B.

Further advantages of the invention result from the third exemplary embodiment ac-cording to FIGS. 5 and 6. According to this variant, the positioning and fastening of the oil filter 2 on the oil sump 1 are not performed via the oil drain screw 7, but rather via clamping means 15 which are situated on the filter housing 20, independently of whether a one-piece or two-piece form of the filter housing 20 is provided, and en-gage in detent means 16, such as detent webs, which are situated on the oil sump side. These fasteners (clamping means 15 and detent means 16) are preferably pro-vided on two opposing sides and thus allow fastening of the oil filter 2 within the oil sump 1" independently of the location of the oil drain screw 7 (not shown). Therefore, the actual position of the oil drain opening and/or the oil drain screw is not important for the fastening of the oil filter 2.

For the third exemplary embodiment according to FIG. 3, in addition to the advantages a), b), and d) through g) of the preceding exemplary embodiments, the advantage thus results that in regard to the receptacle fastening, the position of the oil drain screw is freely selectable. To reinforce the fastening of the oil filter 2 in the oil sump 1, it is optionally possible to use the oil drain screw 7 (not shown) for positioning and fixing the oil filter 2 in addition to the clamping means 15.

The integrated oil filter 2 is preferably a main stream oil filter used as a suction oil filter. It is also conceivable to implement the oil filter 2 having additional connections as a combination of a suction and pressure oil filter. It is also advantageous if needed to situate both main stream oil filter and also secondary stream oil filter in the shared filter housing 20.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An oil sump apparatus for engines or transmissions, comprising:
   a filter comprising a filter housing, including a filter housing top shell, a filter housing bottom shell connected to the filter housing top shell, a threaded bush connected to the bottom shell, a filter medium between the top shell and the bottom shell, a filter inlet, and a filter outlet, wherein the top shell comprises the filter outlet, the bottom shell comprises the filter inlet, and the threaded bush comprises an internal thread;
   a floor area of the oil sump, the floor area comprising an oil drain opening; and
   an oil drain screw comprising an external thread;
   wherein:
   when the filter housing is installed in said oil sump, the threaded bush is disposed substantially over the oil drain opening; and
   the oil drain screw is moveable from an open position to a closed position within the oil drain opening, wherein in the closed position, the oil drain screw extends upwards through the oil drain opening such that the external thread threadably engages with the internal thread of the threaded bush, thereby closing the oil drain opening and at least partially fastening the filter housing to the floor of area of the oil sump.

2. The oil sump apparatus of claim 1, wherein the filter housing is fastened to the oil sump solely by engagement of the internal thread with the external thread.

3. The oil sump apparatus of claim 1, wherein said filter medium is clamped between the filter housing top shell and the filter housing bottom shell.

4. The oil sump apparatus of claim 1, wherein said oil drain screw further comprises a sealing ring.

* * * * *